United States Patent [19]

Lohrberg

[11] Patent Number: 4,851,198

[45] Date of Patent: Jul. 25, 1989

[54] REACTOR FOR PRODUCING CHLORINE DIOXIDE

[76] Inventor: Karl Lohrberg, Breslauer Strabe 1, D-6056 Heusenstamm, Fed. Rep. of Germany

[21] Appl. No.: 170,665

[22] Filed: Mar. 10, 1988

Related U.S. Application Data

[63] Continuation of Ser. No. 942,522, Dec. 16, 1986, abandoned.

[30] Foreign Application Priority Data

Dec. 24, 1985 [DE] Fed. Rep. of Germany ....... 3546010

[51] Int. Cl.⁴ .......................... B01D 3/20; B01D 3/32; B01J 10/00
[52] U.S. Cl. .................................... 422/193; 261/109; 261/110; 422/194; 422/195
[58] Field of Search ............... 422/170, 187, 193, 194, 422/195; 261/108–110

[56] References Cited

U.S. PATENT DOCUMENTS

| | | | |
|---|---|---|---|
| 1,107,803 | 8/1914 | Koppers | 261/108 |
| 1,620,593 | 3/1927 | Brown | 261/114.1 |
| 1,765,087 | 6/1930 | Mase | 261/114.1 |
| 1,811,247 | 6/1931 | Smith | 261/114.1 |
| 1,822,609 | 9/1931 | Brewster | 261/114.1 |
| 1,854,002 | 4/1932 | Subkow | 261/114.1 |
| 2,344,700 | 3/1944 | Hutcheson et al. | 261/114.1 |
| 2,582,317 | 1/1952 | Donohue | 422/193 |
| 2,713,478 | 7/1955 | Ragatz | 261/114.1 |
| 2,926,754 | 3/1960 | Ragatz | 261/114.1 |
| 3,509,203 | 4/1970 | Michaelis et al. | 261/114.1 |
| 4,556,522 | 12/1985 | Wilson | 261/114.1 |

FOREIGN PATENT DOCUMENTS

| | | |
|---|---|---|
| 0095199 | 11/1983 | European Pat. Off. . |
| 693413 | 6/1940 | Fed. Rep. of Germany . |
| 2140783 | 1/1974 | Fed. Rep. of Germany . |
| 62972 | 8/1925 | Sweden ............... 422/193 |

*Primary Examiner*—Barry S. Richman
*Assistant Examiner*—Timothy M. McMahon
*Attorney, Agent, or Firm*—Herbert Dubno

[57] ABSTRACT

Chlorine dioxide is increasibly used to bleach pulp and the like. Chlorine dioxide is produced in a reactor, which contains a plurality of superimposed bubble cap trays, which are provided with passages for the gas and with duct, which is independent of the gas passages and serves as an overflow for the liquid. In order to maintain a maximum $ClO_3$/acid ratio for the longest time possible, the reaction chamber above each bubble cap tray is divided into a large number of reaction compartments by vertical partitions, which define openings for the passage of the reaction liquid. Acid can be supplied to each compartment. The partitions can be used to define in each reaction chamber any desired number of reaction compartments, which are connected in parallel for the flow of acid and are connected in series for the flow of the chlorate solution.

2 Claims, 3 Drawing Sheets

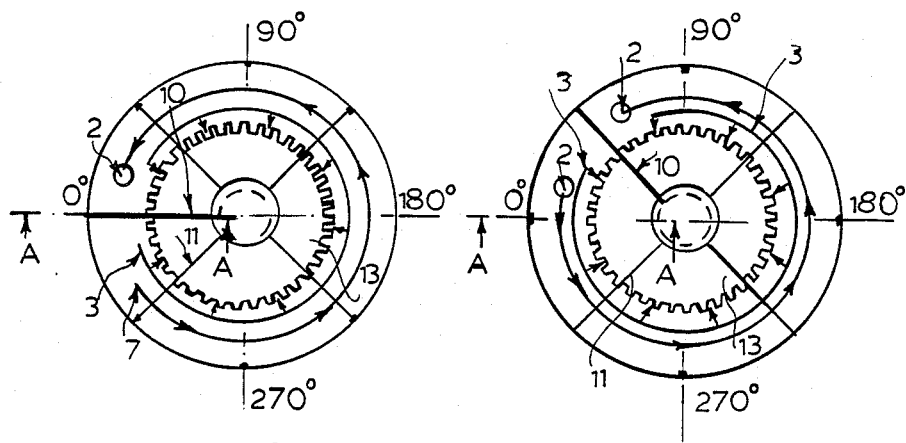
FIG 2.1  FIG 2.2
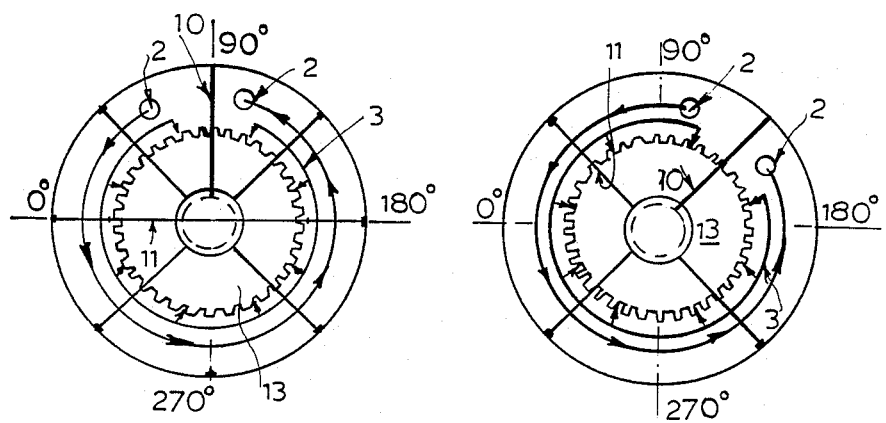
FIG 2.3  FIG 2.4

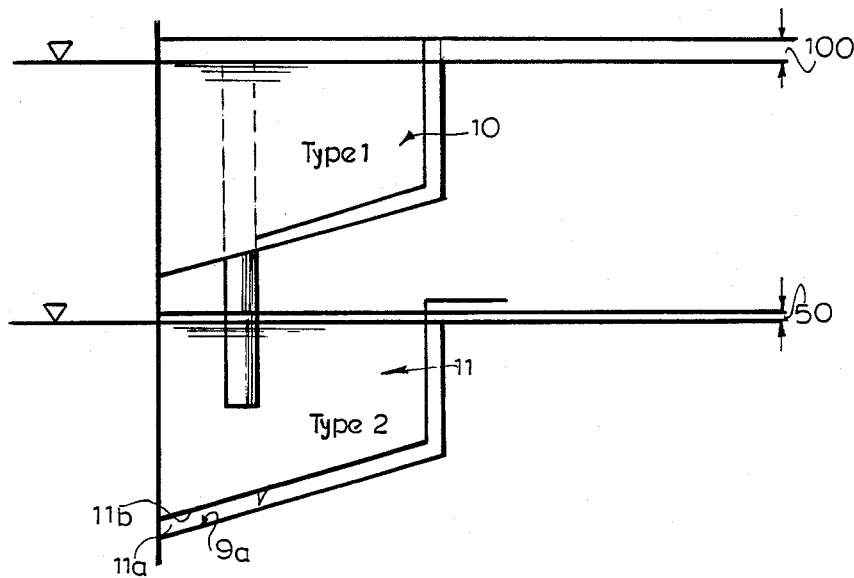

REACTOR FOR PRODUCING CHLORINE DIOXIDE

This is a continuation-in-part of co-pending application Ser. No. 942,522, filed on Dec. 16, 1986, now abandoned.

FIELD OF THE INVENTION

This invention relates to a reactor for producing chlorine dioxide.

BACKGROUND OF THE INVENTION

Reactions between gases and liquids are mostly carried out as countercurrent operations. If the rates of liquid and gas are relatively high, towers are used, which contain packing elements and in which the liquid trickles in a countercurrent to the gas. If the rate of liquid flow is low relative to the rate of gas flow, bubble cap trays or similar internal fixtures are employed. It is more difficult to optimize such equipment for reactions in which a gas is formed from components of the liquid. In such cases, the rate at which the gas is formed must be taken into account in the structural design of the reactor so that the volume ratio of gas to liquid must be taken into account as well as the rate of the gas-producing chemical reaction. In cases in which the liquid to be reacted is nevertheless to be conducted in a countercurrent to the gas, cascades comprising a plurality of reactor vessels have been used and the vessels of the cascade have been laterally offset or vertically aligned (German patent specification No. 924,689). If the several vessels or reactor chambers are vertically aligned, they may be interconnected, e.g., by immersed overflow ducts for the liquid or by immersed gas ducts, each of which basically corresponds to a large bubble cap of a bubble cap tray (Published German Application No. 31 18 795).

A typical example of such a gas-producing chemical reaction is the production of chlorine dioxide, e.g. by the action of hydrochloric acid on sodium chlorate in a process in which a purging or diluent gas is conducted in a countercurrent.

The formation of $ClO_2$ may be the result of two reactions, both of which occur in practice. Reaction 1.2 should be suppressed as far as possible.

1.1 $NaClO_3 + 2HCl \rightarrow ClO_2 + \frac{1}{2}Cl_2 + NaCl + H_2O$

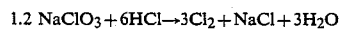

1.2 $NaClO_3 + 6HCl \rightarrow 3Cl_2 + NaCl + 3H_2O$

In that process of producing $ClO_2$, the following requirements must be met:

(a) The ratio of $NaClO_3$ to HCl must be high so that reaction 1.1 will be promoted (see Swindell Pulping Conference, pages 195 et seq., 1984).

(b) The concentrations of $NaClO_3$ and HCl must be as high as possible so that the formation of $ClO_2$ is accelerated owing to the fact that the rate at which $ClO_2$ is formed is directly proportional to the product of the multiplication of the HCl concentration and $NaClO_3$ concentration.

A reaction of the entire quantity of acid and the entire quantity of chlorate will take some hours.

It is known that the actual controlling factor is the $H^+$ ion concentration rather than the concentration of hydrochloric acid. It has been attempted to control the $H^+$ ion concentration by an addition of buffer solutions (see U.S. Pat. No. 4,086,328).

Because the $Na_2Cr_2O_7$ acts as a buffer, the higher efficiencies stated by Swindell will be obtained if said substance is employed. As a result, any acid can be used, on principle, in combination with a reducing agent in known manner to produce $ClO_2$ from $NaClO_3$, e.g., $NaClO_3 + NaCl + H_2SO_4 \rightarrow ClO_2 + \frac{1}{2}Cl_2 + Na_2SO_4 + H_2O$ or $2 NaClO_3 + SO_2 \rightarrow 2 ClO_2 + Na_2SO_4$ For these two reactions, a supply of $H_2SO_4$ at one point will be required.

Because chlorine dioxide is a gaseous chemical compound which in excessively high concentrations decomposes explosively, the partial pressure must be reduced in order to avoid explosions. This can be accomplished in that a subatmospheric pressure is maintained. Alternatively, the gas may be diluted with another gas or both measures may be combined. The $ClO_2$ gas is blown within seconds or a few minutes.

Owing to the high acid concentration required and to the need for blowing out the mixed $ClO_2$—$Cl_2$ gases, the process is ideally carried out as a countercurrent operation.

BRIEF DESCRIPTION OF THE DRAWING

In the drawing:

FIGS. 2.1–2.4 are diagrammatic plan views illustrating the partitioning of the four bubble cap trays of a reactor similar to that of FIG. 1 in accordance with the prinicples of the present invention showing by arrows the flow on each tray; and FIG. 3 is a partial vertical section generally along line A—A of FIG. 2.1 showing the two types of partitions used in accordance with the invention.

Figure 1:
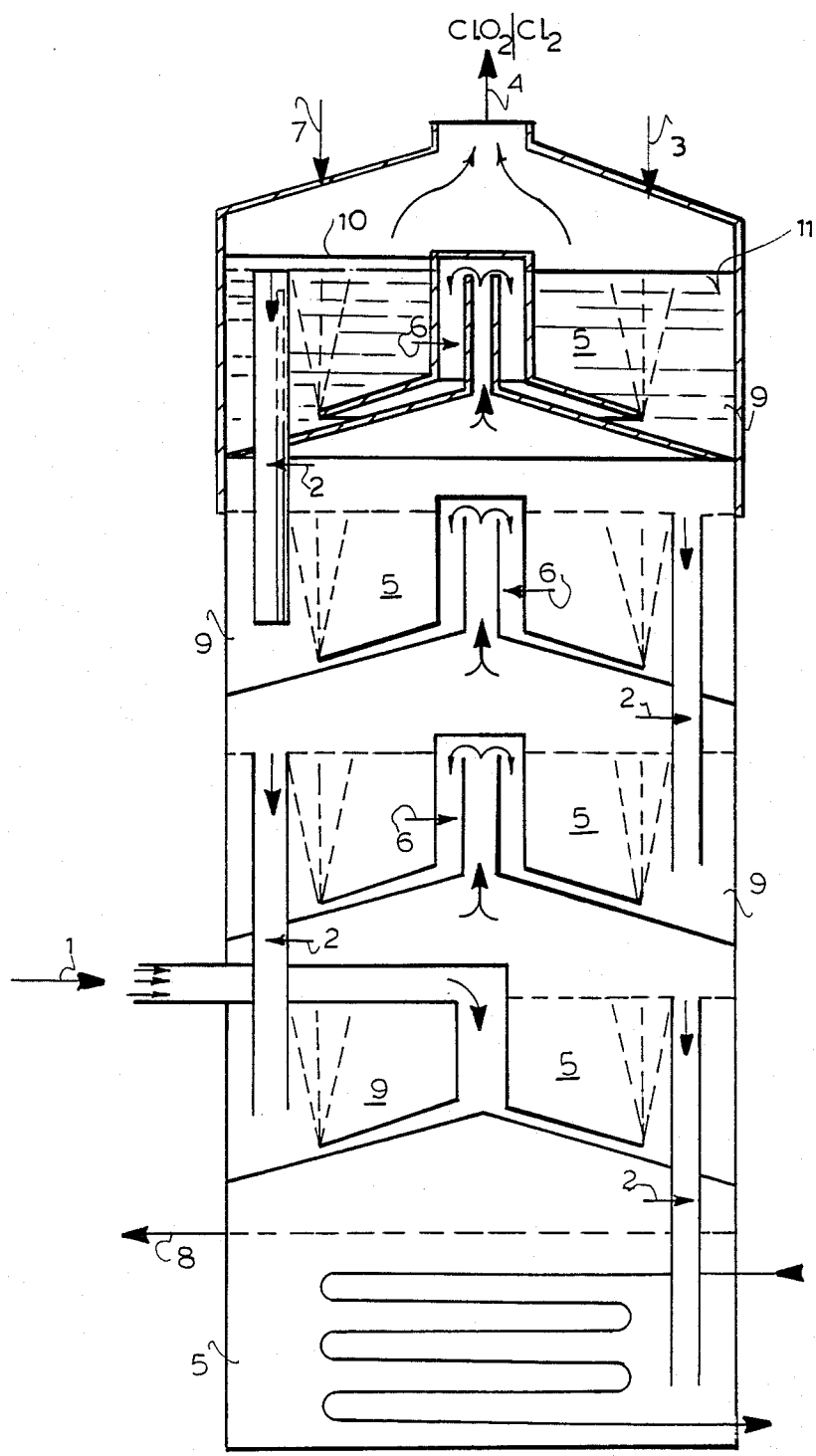
FIG. 1 is a vertical section through a reactor for the production of chlorine dioxide from sodium chlorate and hydrochloric acid using four bubble cap trays or stages and one boiling stage, illustrating a prior art construction of the reactor.

Known processes are carried out in reactors having certain features also present in FIG. 1 including reaction chambers that are hydraulically separated from each other.

The reactor is supplied at its top with hydochloric acid through line 3 and with an aqueous solution of sodium chlorate through line 7. A gaseous diluent, such as air, is drawn in through the inlet 1. The reaction products chlorine dioxide and chlorine and the gaseous diluent leave the reactor at the outlet 4. The reactor is provided with liquid overflow ducts 2 and with bubble caps 6. The spent reaction solution is withdrawn through line 8. The reaction chambers 5 are separated on the liquid and gas sides by immersed structures, which on the gas side consist of bubble caps. As a result, the final concentration is obtained in each reaction chamber 5 because the initial concentrations of acid and $NaClO_3$ are decreased immediately and cannot be utilized for an optimum reaction.

This will now be explained by a few examples:

A four-stage reactor comprising a boiling stage is to be used for a reaction of a solution containing 450 g/l $NaClO_3$ with a hydrochloric acid having a concentration of 380 g HCl per liter. Both reactants should be virtually completely reacted. To carry out reaction 1.2, 1 liter of chlorate solution must be mixed with about 0.9 liter hydrochloric acid solution so that the following concentrations are obtained at the inlet before a reaction can take place

| | |
|---|---|
| NaClO₃ | 237 g/l |
| HCl | 200 g/l |

Because owing to their high concentrations about 50% of the NaClO₃ and HCl react in the first stage, the actual concentrations in the first stage are approximately 180 g/l NaClO₃ and 100 g/l HCl That immediate dilution involves a loss of a large part of the reaction potential so that a larger number of stages would be desired.

The same considerations lead to the result that a complete reaction of acid and chlorate could not be effected in a single-stage reactor unless the residence time is excessively long because the concentrations in the reactor would have to approach zero if the non-gaseous reaction products are to be discharged in a solid state, independently of the concentrations of the reactants. Such crystallization is inherently undesirable because the crystallization products must subsequently be redissolved in most cases. Besides, crystallization involves an incrustation and deposition in the reactor so that the latter must be shut down and rinsed after regular intervals of time.

OBJECT OF THE INVENTION

It is an object of the invention to avoid the above-mentioned and other disadvantages of the known apparatus and to provide a reactor for carrying out gas-producing reactions in a liquid medium under improved reaction conditions.

SUMMARY OF THE INVENTION

That object is accomplished in accordance with the invention by the provision of a reactor for producing chlorine dioxide from sodium chlorate and hydrochloric acid or another acid in a reducing liquid medium in a process in which a purging gas is conducted in a countercurrent, which reactor comprises a plurality of superimposed internal fixtures, which are provided with openings and restrict the backmixing of gas and liquid.

In a reactor of the kind described hereinbefore the invention resides in that the internal fixtures consist of bubble cap trays, which are disposed on different levels and define liquid-containing reaction chambers, which are subdivided by a vertical partition. The partition between the inlet and outlet is liquid-tight as far as to the tray. The bottom portions of the other partitions define passages for the liquid.

In the reactor in accordance with the invention at least two bubble cap trays and desirably a larger number of bubble cap trays are provided and are suitably regularly distributed throughout the height of the reactor. The bubble cap trays may be equal or different in height. If the heights are different, the residence times of the reaction liquid will be different too.

Each bubble cap can have a single bubble cap but should be provided with partitions defining at least two and up to four or more reaction compartments.

As a result of the invention, the reactor is divided into any desired number of reaction compartments by the installation of a corresponding number of trays and partitions, which restrict or prevent a mixing of the reaction solution.

If each reaction chamber of the reactor is provided in accordance with the invention with a single inlet for controlled feeding of chlorate, a single inlet for controlled feeding of reducing agent, if the acid does not act also as a reducing agent, and with means for a controlled supply of acid to each reaction compartment, the following advantages will be obtained:

At least in the first reaction compartment of each reaction chamber the product of the multiplication of the concentrations of chlorate and acid is sufficient to ensure a sufficiently high reaction rate: at least in the first reaction compartment of each reaction chamber the ratio of the chlorate concentration to the acid concentration is sufficiently high for a total efficiency in excess of 90% to be achieved.

SPECIFIC DESCRIPTION AND EXAMPLES

The trays of the conventional reactor described in connection with FIG. 1 are provided with partitions in the patterns shown in FIGS. 2.1–2.4 for the uppermost, second, third and fourth bubble cap trays of the reactor of FIG. 1.

As can be seen from FIG. 3, two types of partitions are used, namely, the partitions 10 and 11. Each of the vertical partitions 10 extends the full vertical cross section of the respective reaction stage, i.e. defines a liquid tight barrier and thus represents the wall separating the input segment of the tray from the output segment thereof. On each tray, the other vertical partitions 11 define respective openings or gaps 11a between the lower edges 11b of these partitions and the bottom surface 9a of a respective bubble cap tray for the passage of liquid from one sector to the next below these partitions and through the gaps.

Thus the eight partitions of FIGS. 2.1–2.4 define eight sectors or compartments and the sector is approximately the 8 o'clock position in FIG. 2.1 can be seen to be the sector receiving the reaction mixture which passes through the clearance provided by the partition 11 in the counterclockwise sense to leave the reaction stage through the downcomer 2 in the sector approximately at the 10 o'clock position (see the arrows in FIG. 2.1).

The reaction mixture thus enters the central compartment in the 10 o'clock position from the downcomer 2 of the next lower reaction stage (FIG. 2.2) and since the barrier partition 10 is here at the 45° position using the angles shown in the drawing, the flow is likewise in the counterclockwise sense from the sector in the 10 o'clock position to the sector approximately in the 11 o'clock position where the liquid phase overflows through the downcomer 2 to the 11 o'clock position of the next lower stage (FIG. 2.3). Here the sealing partition 10 is in the 12 o'clock position or the 90° position as shown.

The liquid flow through the clearances provided by the partitions 11 is in the clockwise sense from the 11 o'clock position to approximately the 1 o'clock position where the liquid phase passes downwardly through a downcomer 2 onto the next lower stage represented by the bubble cap tray of FIG. 2.4. On this bubble cap, the vertical partition 10 which terminates the path of the liquid along the bubble tray is at the 135° position so that the liquid flowing in the counterclockwise sense from the 1 o'clock position leaves this stage at approximately the 2 o'clock position through a downcomer 2 and flows to the boiler therebelow from which gases are driven off.

From the boiler and at each stage below the upper stage of FIG. 2.1, the gas rises upwardly through the next higher bubble cap. The gases generated at the uppermost stage of FIG. 2.1 pass directly to the outlet at 4 as has been described in connection with FIG. 1.

A reactor (FIG. 1) was employed, which contained bubble caps 6, which were disposed on different levels, and were not provided with internal partitiions. The bubble caps had a height of 800 mm. For a flow of liquid, each bubble cap tray was provided with an overflow duct 2. An escape of gas was permitted by gaps 9 defined by each bubble cap and the associated tray.

A mixture consisting of sodium chlorate solution and hydrochloric acid and having the following composition was supplied to the reactor under the usual pressure and temperature conditions:

| | |
|---|---|
| $NaClO_3$ | 280 g/l |
| NaCl | 60 g/l |
| HCl | 140 g/l |
| $H_2O$ | 800 g/l |

1. The following concentrations were maintained in the effluent solution:

| | |
|---|---|
| $NaClO_3$ | 140 g/l |
| NaCl | 150 g/l |
| HCl | 20 g/l |
| $H_2O$ | 880 g/l |

The following reaction conditions were selected in order to maintain said concentrations in the effluent:

The reactor consisted of six stages (four reaction stages, two boiling stages) and the resistance times of the liquid on all trays were the same.

| | |
|---|---|
| Total residence time | 6 hours |
| Efficiency | 89.5% |

2. Less hydrochloric acid was added to the feed solution so as to obtain the following concentrations in the effluent solution:

| | |
|---|---|
| $NaClO_3$ | 180 g/l |
| NaCl | 130 g/l |
| HCl | 15 g/l |
| $H_2O$ | 890 g/l |

The remaining reaction conditions were the same as in Experiment 1.

The reactor consisted of six stages (four reaction stages, two boiling stages) and the residence times of the liquid on all trays were the same.

| | |
|---|---|
| Total residence time | 6 hours |
| Efficiency, approximately | 91.5% |

3. If hydrochloric acid was fed in the same reactor in such a quantity that the concentrations of $NaClO_3$ and HCl were reduced to 10 g/l each, an efficiency of 82% was obtained.

4. In the same reactor, each of the upper four bubble cap trays was provided in accordance with the invention with eight partitions, which defined eight compartments, and hydrochloric acid was supplied to each compartment in such a quantity that the concentrations of chlorate and hydrochloric acid were decreased to 10 g/l each. An efficiency of about 95% was obtained.

A higher efficiency than in a conventional reactor can be obtained in a reactor in accordance with the invention. The term "efficiency" is used herein to indicate the percentage of the total sodium chlorate which is decomposed, e.g., in accordance with the equation $$NaClO_3 + 2HCl \rightarrow ClO_2 + \tfrac{1}{2}CL_2 + NaCl + H_2O$$

rather than in accordance with the equation $$NaClO_3 + 6HCl \rightarrow 3Cl_2 + NaCl + 3H_2O$$

It is apparent from FIGS. 2.1 to 2.4 that each reaction chamber 5 of the reactor shown in FIG. 1 has been divided in accordance with the invention into six reaction compartments 13 by vertical partitions 10 (type 1 in FIG. 3) and 11 (type 2 in FIG. 3). A feeder 3 for a controlled supply of acid is associated with each reaction chamber 5 and supplies acid to each reaction compartment 13. The chlorate inlet 7, the diluent gas inlet 1, the outlet 4, the liquid overflow ducts 2, the bubble caps 6, the reaction chambers 5 and the line 8 for discharging the liquid reaction products are designed as in accordance with FIG. 1.

FIG. 3 shows the arrangement of the different partitions 10 (type 1) and 11 (type 2). Partitions 10 (type 1) is liquid-tight. Partition 11 (type 2) defines an opending for the passage of liquid.

I claim:

1. A reactor for producing chlorine dioxide by the reaction of sodium chlorate and an acid in a liquid, comprising:

an upright reaction vessel formed at an upper end with an outlet for chlorine gas and chlorine dioxide and means for feeding a liquid containing a sodium chlorate to said vessel for reaction with acid therein;

a plurality of vertically spaced bubble cap trays in said vessel each having a single central bubble cap and a bottom surface bounded by a vertical wall, each of said bubble cap trays being adapted to receive a layer of a liquid supplied by said means for feeding through which a rising gas from a lower stage is bubbled, each of said trays being provided with a downcomer for delivering overflowing liquid to a next lower stage;

a plurality of radial partitions on each of said bubble cap trays for subdividing same into reaction compartments in the form of sectors including a first sector receiving liquid from above an outlet sector provided with the respective one of said downcomers for discharging liquid onto a next lower stage, at least some of said partitions having lower edges defining gaps with the bottom surfaces of the respective bubble cap trays through which liquid can pass beneath the partitions defining said gaps, through said gaps and around the respective bubble cap from an inlet sector to an outlet sector thereof;

means for supplying acid to each of said reaction compartments in parallel on each of said bubble cap trays; and means for admitting a scavenging gas below a lowermost one of said bubble caps for upward flow through said vessel and through said bubble caps upwardly from tray to tray in counterflow to the passage of liquid from tray to tray downwardly in said vessel.

2. The reactor defined in claim 1 wherein one of said partitions of each bubble cap tray is sealingly affixed thereto over the entire cross section of the respective liquid layer while all others of said partitions of each bubble cap tray each define respective one of said gaps therewith.

* * * * *